United States Patent [19]
Mazzarins

[11] 3,773,135
[45] Nov. 20, 1973

[54] STEERING MECHANISM FOR ARTICULATED VEHICLE

[75] Inventor: Janis Mazzarins, Macedonia, Ohio

[73] Assignee: General Motors Corporation, Detroit, Mich.

[22] Filed: Sept. 20, 1972

[21] Appl. No.: 290,454

[52] U.S. Cl. ............................. 180/79.2 B, 280/469
[51] Int. Cl. ............................................... B62d 5/10
[58] Field of Search ..................... 180/79.2 B, 51; 280/464, 469

[56] References Cited
UNITED STATES PATENTS
2,917,125  12/1959  Donner et al. ................. 180/79.2 B
3,338,329  8/1967   Orth .............................. 180/79.2 B Primary Examiner—Benjamin Hersh
Assistant Examiner—John A. Pekar
Attorney—William S. Pettigrew et al.

[57] ABSTRACT

A steering mechanism for an articulated vehicle having first and second frame sections which are pivotally interconnected about a vertical steering axis for relative steering articulation therebetween to either side of straight-ahead alignment of the frame sections. The steering mechanism is characterized by having a pinion fixed with one of the frame sections, while the other frame section supports a pair of double-acting hydraulic steering cylinders, each of which has a piston formed with a rack which meshes with the pinion. Each steering cylinder is pivotally supported at its forward end while the rack is maintained in engagement with the pinion by a guide roller that is located in transverse alignment with the pinion and is adjustable in position for assuring proper engagement between the gear teeth of the rack and pinion.

4 Claims, 6 Drawing Figures

STEERING MECHANISM FOR ARTICULATED VEHICLE

This invention in general concerns a steering mechanism for a vehicle and more particularly a steering arrangement which is suitable for an articulated type vehicle such as an earthmoving scraper. Copending patent application Ser. No. 290,453, filed Sept. 20, 1972 entitled "Steering Mechanism For Articulated Vehicle," in the name of Janis Mazzarins and assigned to the assignee of this invention concerns a rack and pinion steering mechanism that includes a pair of hydraulic steering cylinders located along axes which are positioned generally parallel to the longitudinal axis of the vehicle. Each of the steering cylinders has the base end thereof pivotally supported by the associated frame member of the scraper while the rack is maintained in engagement with the pinion by a guide roller having a pair of radially extending flanges.

This invention concerns a steering mechanism which is similar to the steering mechanism of the aforementioned patent application but differs therefrom in that the steering cylinders are pivotally supported adjacent the forward ends thereof and each guide roller is supported for adjustable movement towards and away from the pinion so as to maintain proper gear tooth engagement between the rack and pinion. By having the pivotal support of the steering cylinders located as described, the cylinder support frame is shortened in length while at the same time allowing for adjustment of each steering cylinder about a vertical axis so as to properly position the rack in relation to the pinion. In this regard, two forms of adjustment mechanisms are provided, one of which causes the guide roller to be positioned towards and away from the pinion. The other consists of a support bracket which is located between the steering cylinders and includes adjustable screws for contacting each of the steering cylinders intermediate the ends thereof and causing one or the other of the cylinders to move laterally outwardly with resultant movement of the rack towards the pinion.

The objects of the present invention are to provide a rack and pinion type steering mechanism for an articulated vehicle that includes adjustable means for positioning the rack relative to the pinion; to provide a rack and pinion steering arrangement for an articulated vehicle which includes a pair of double-acting hydraulic steering cylinders pivotally supported adjacent the forward end of each cylinder and combined with adjustable means for movement of the rack towards or away from the pinion; to provide a steering mechanism which includes a rack and pinion and in which the rack is movable by a hydraulic steering cylinder that can be adjustably positioned about a support pivot for proper engagement of the gear teeth formed with the rack and pinion; to provide a rack and pinion steering mechanism for an articulated vehicle having a guide roller which can be adjustably positioned towards and away from the pinion for assuring proper engagement between the gear teeth; and to provide a pair of hydraulic steering cylinders for a rack and pinion type steering arrangement in which the cylinders are pivotally supported adjacent the forward ends thereof and have the base ends of the cylinders combined with adjustment means which selectively serve to move the cylinders towards each other or away from each other for proper positioning of the rack relative to the pinion.

Other objects and advantages of the present invention will be apparent from the following detailed description when taken with the drawings in which.

Figure 1:
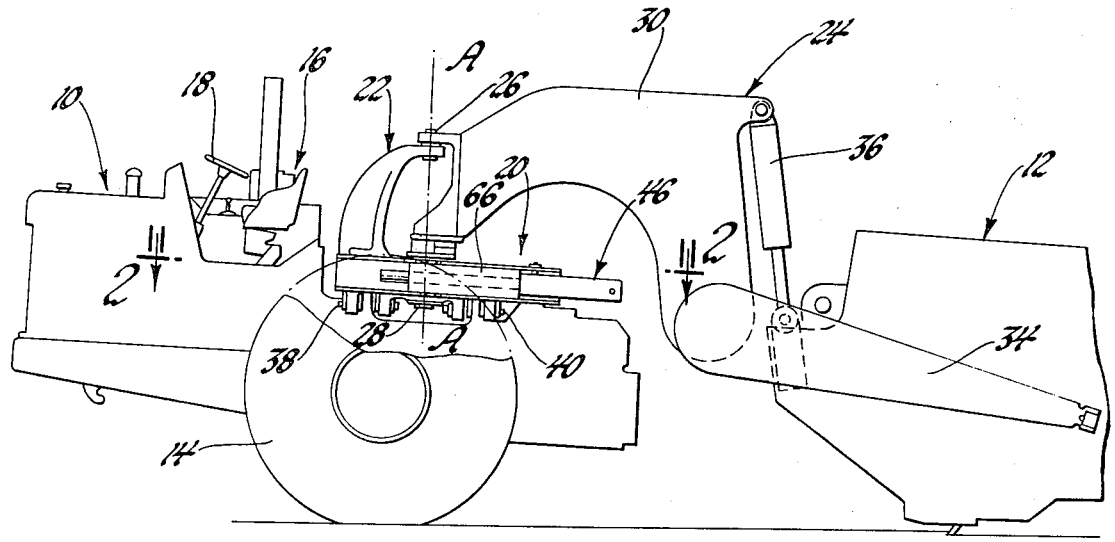
FIG. 1 is a side elevational view showing an articulated vehicle incorporating a steering mechanism made according to the invention.

Referring to the drawings and more particularly FIG. 1 thereof, an off-highway earthmoving vehicle is shown comprising the usual overhung tractor 10 and a trailing scraper bowl 12. The tractor 10 is supported by a pair of laterally spaced drive wheels, one of which is indicated by the reference numeral 14 and includes the usual operator's station 16 having a steering wheel 18 for controlling articulation of the tractor 10 relative to the scraper bowl 12. In this regard, steering is provided by a steering mechanism 20 which is carried by the tractor 10 above the rotational axis of the wheel 14 and is combined with a steering frame member 22 and a pull-yoke frame member 24 the latter of which extends rearwardly and supports the scraper bowl 12. The steering mechanism 20 serves to provide for relative steering articulation of the tractor 10 relative to the scraper bowl 12 about a vertical steering axis A—A which extends through the longitudinal centers of an upper king-pin 26 and lower king-pin 28. The king-pins 26 and 28 serve to connect the pull-yoke frame member 24 to the steering frame member 22.

More specifically, the pull-yoke frame member 24 includes the usual gooseneck which comprises a pair of diverging arms 30 and 32 extend rearwardly and downwardly for rigid connection with a transverse torque tube (not shown), the opposite ends of which support a pair of laterally spaced pull arms, one of which is indicated by the reference numeral 34. As is conventional, the pull arms extend rearwardly for pivotal connection with the side wall of the scraper bowl 12 and serve as support means during movement of the scraper bowl 12 between a lowered-dig position and a raised-carry position as provided by double-acting hydraulic bowl cylinders 36, one of which is shown extending between the upper rear portion of the gooseneck and the front end of the scraper bowl 12.

The steering frame member 22 is generally of an L-shape and has a base section 37 connected to the frame of the tractor 10 by a pair of longitudinally aligned and horizontally extending pivotal connections 38 and 40. This arrangement permits the tractor 10 to oscillate relative to the steering frame member 22 as well as the scraper bowl 12 about a longitudinally extending horizontal axis defined by the pivotal connections 38 and 40 so as to permit the vehicle to traverse irregular terrain.

Figure 2:
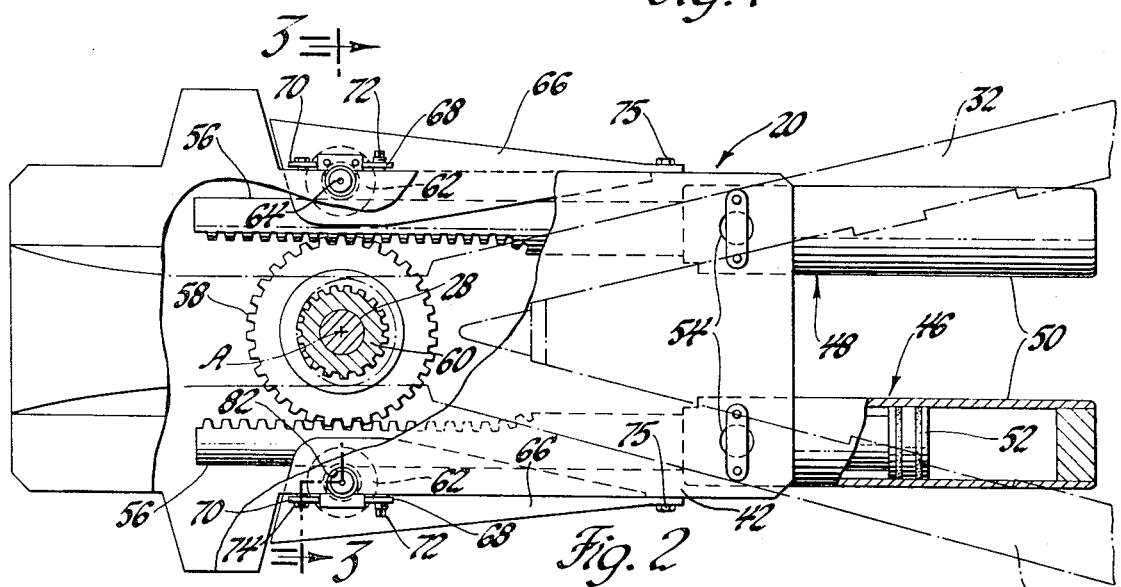
FIG. 2 is an enlarged view taken on line 2—2 of FIG. 1 and showing the steering mechanism.
Figure 3:
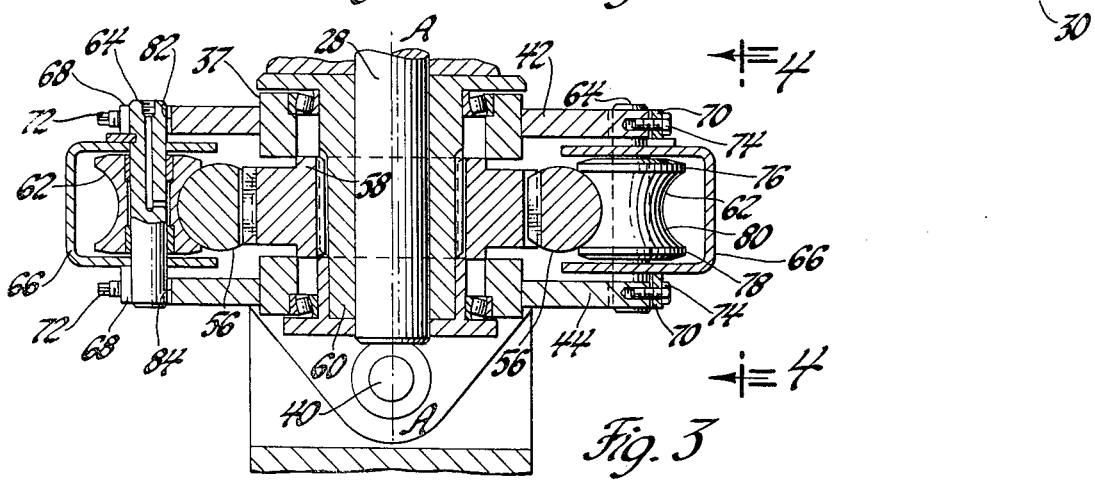
FIG. 3 is a further enlarged sectional view taken on line 3—3 of FIG. 2.

As best seen in FIGS. 2 and 3, the steering frame member 22 includes upper and lower cylinder support plates 42 and 44 that are vertically spaced from each other and located in horizontal planes. The cylinder support plates 42 and 44 are fixed with the base section 37 of the steering frame member 22, and located between the support plates 42 and 44 are a pair of substantially parallel double-acting hydraulic steering cylinders 46 and 48, each of which includes a cylinder member 50 and a relatively reciprocable piston member 52. Each cylinder member 50 is supported adjacent its forward end thereof by the upper and lower support plates 42 and 44 for pivotal movement about a vertical axis as provided by a pivotal connection 54. The piston member 52 of each steering cylinder is formed with a rack 56 which extends forwardly for meshing engagement with a pinion 58 that is splined to an adapter 60. The adapter 60 is intended to be fixedly secured to the forward end of the gooseneck by bolts or other suitable means so in effect the adapter 60, king-pin 28, and the gooseneck constitute one integral unit.

Figure 4:
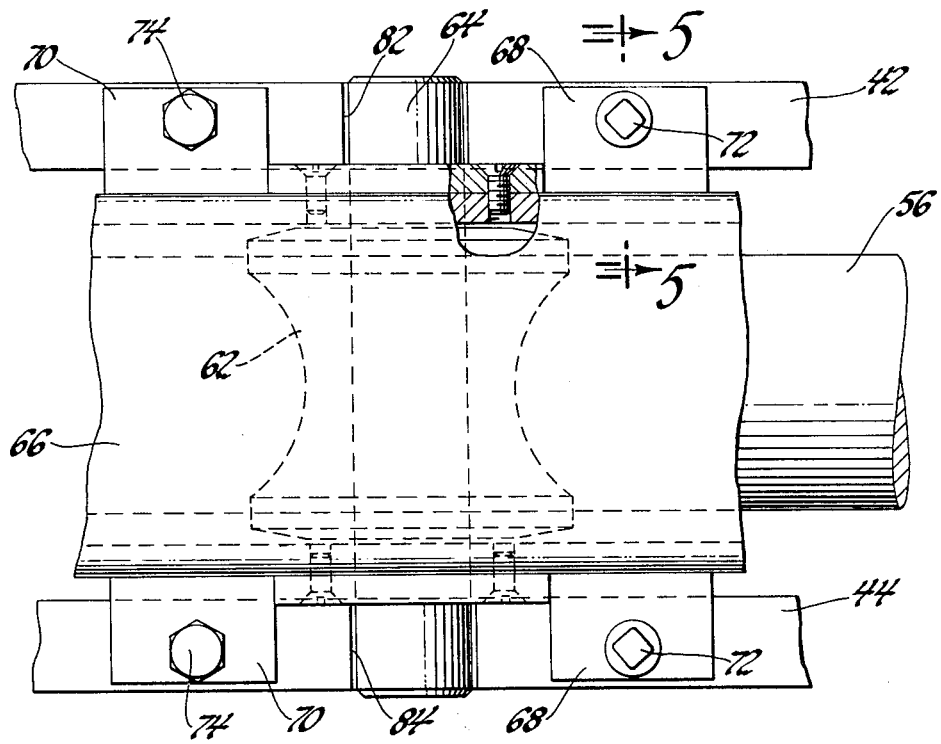
FIG. 4 is a still further enlarged view taken on line 4—4 of FIG. 3.
Figure 5:
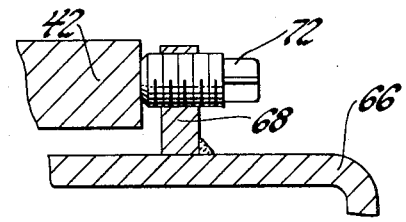
FIG. 5 is a cross-sectional view taken on line 5—5 of FIG. 4.

Although not shown, a suitable hydraulic steering system is provided which includes appropriate valving for permitting movement of the steering wheel 18 to result in pressurized fluid being directed to one end or the other of each steering cylinder 46 and 48 while exhausting the other end. In addition, it will be noted that a guide roller 62 is provided for each rack 56 and is rotatably carried by a vertical shaft 64 the opposite ends of which are fixed with an adjustable support bracket 66 which is carried by the side edges of the support plates 42 and 44. Thus as seen in FIGS. 3 and 4, each support bracket 66 is generally U-shape in cross-section and includes two sets of vertically aligned and rigidly fixed mounting tabs 68 and 70 suitably bored for receiving adjustment screws 72 and 74 respectively. The screws 74 together with screws 75 at the rear of the support bracket 66 serve to secure the latter to the side edges of the support plates 42 and 44. As seen in FIG. 5, the vertically aligned screws 72 are formed with a slot permitting fine screwdriver adjustment of the tabs 68 and, accordingly, the guide roller 62 relative to the rack 56. In this regard, the support bracket 66 is first fixed to the support plates 42 and 44 by the screws 75. Screws 74 are then passed through the accommodating bores and threaded several turns into the support plates. The screws 72 are then used for adjusting the position of the guide roller 62 so that proper gear teeth meshing between the rack and pinion is realized, and afterwards, screws 74 are tightened so that the adjustment is maintained.

Each guide roller 62 is formed with a pair of radially extending flanges 76 and 78 between which is a body portion having a contact surface 80 which is complementary to the outer configuration of the rack 56. In this instance, the rack 56 is generally circular in cross section and, accordingly, the contact surface 80 on the guide roller 62 is suitably curved to conform to the outer shape of the rack 56. In addition and as aforementioned, the guide roller 62 is rotatably supported by the support bracket 66 and as seen in FIGS. 2, 3 and 4, the ends of each shaft 64 are located in U-shaped grooves 82 and 84 formed in the upper and lower support plates 42 and 44 respectively. Thus, by adjustment of the screws 72 and 74, the position of the support bracket 66 as well as the guide roller 62 can be varied towards and away from the pinion 58 so as to provide proper meshing engagement between the gear teeth of rack and pinion and thereby prevent a backlash condition. It will also be noted that the arrangement is such that the guide rollers 62 are located along a transverse axis which passes through the center of the rotational axis of the pinion 58.

From the above description and as seen in FIG. 2, it should be apparent that by expanding steering cylinder 46 while contracting steering cylinder 48, the tractor 10 will be rotated relative to the trailing scraper bowl 12 in a clockwise direction about the steering axis A—A. This occurs because the pinion 58 is fixed with the scraper bowl 12 and, accordingly, the latter, being the heavier of the two sections of the vehicle, serves as a reaction member causing each rack 56 to, in effect, walk around the pinion 58 during actuation of the steering cylinders.

Figure 6:
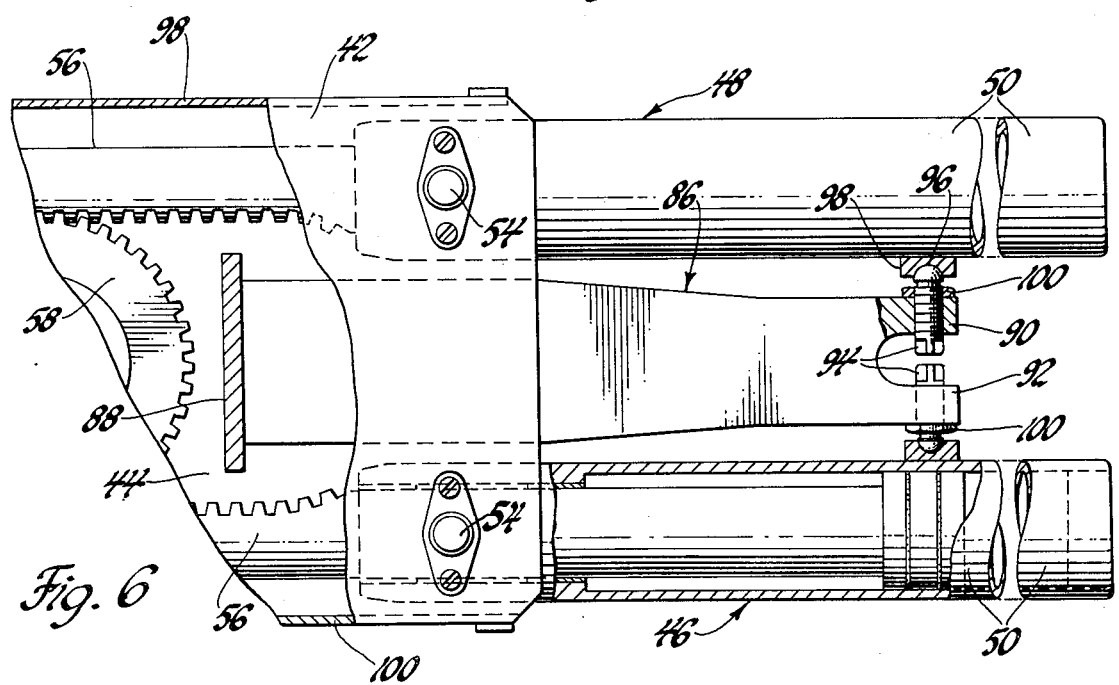
FIG. 6 is a view showing a modified form of the invention disclosed in FIGS. 1 through 5.

FIG. 6 of the drawings shows a modified form of the invention and in this regard it will be noted that those parts corresponding to the parts incorporated with the steering mechanism shown in FIGS. 1 through 5 are identified by the same numerals. The steering mechanism of FIG. 6 differs from the above-described mechanism in that a support bracket 86 is fastened by a vertical bar 88 to the support plates 42 and 44 of the steering frame 22 and extends horizontally rearwardly therefrom into a position between the hydraulic steering cylinders 46 and 48. The support bracket 86 terminates at its rear end with a pair of laterally spaced ears 90 and 92, each of which is provided with an adjusting screw 94. The inboard end of each screw 94 is formed so as to receive a tool for rotating the screw 94 in one direction or another while the other end has a hemispherical head 96 which is received by a block 98 rigidly secured to the cylinder member 50 of the associated steering cylinder. The block 98 has a concave spherical bearing surface formed therein for accommodating the head 96 so that upon rotating the screw 94 in a direction so as to cause it to extend laterally outwardly from the support bracket 86, the steering cylinder is pivoted about its pivotal connection 54 and causes the associated rack 56 to be adjusted in position relative to the pinion 58. Each screw 94 is provided with a nut 100 which is tightened against the associated ear to lock the screw in place after the desired adjustment has been completed.

It will be noted that as seen in FIG. 6, the support plates 42 are joined at their opposite edges by side walls 98 and 100 for shielding the various parts of the steering mechanism from damage and contamination by foreign objects and particles. It will be understood, that although not shown, similar side walls are provided with the steering mechanism shown in FIGS. 1-5.

Various changes and modifications can be made in this construction without departing from the spirit of the invention. Such changes and modifications are contemplated by the inventor and he does not wish to be limited except by the scope of the appended claims.

I claim:

1. A steering mechanism for an articulated scraper vehicle including a tractor and a trailing bowl, comprising a steering frame member connected to said tractor for oscillation about a horizontal axis extending parallel to the longitudinal axis of the scraper vehicle, a pull-yoke frame member comprising a gooseneck and a pair of laterally spaced pull arms for supporting said trailing bowl, means connecting the gooseneck to the steering frame member along a vertical steering axis for relative steering articulation of the tractor and the trailing bowl to either side of straight-ahead steering alignment, said means including a king-pin rigidly secured to one of said frame members and having a pinion fixed thereto, a pair of double-acting hydraulic steering cylinders mounted on the other of said frame members along laterally spaced axes located on opposite sides of the vertical steering axis, each of said steering cylinders including a piston member and a cylinder member, cylinder support means pivotally connecting the forward end of each cylinder member to said other of said frame members along an axis parallel to said vertical steering axis, said piston member having the rod portion thereof formed with a rack which meshes with said pinion, and means operatively associated with the steering cylinders for moving the latter about the cylinder support means so as to position the racks toward and away from the pinion for adjusting the meshing engagement between the rack and pinion.

2. The steering mechanism of claim 1 wherein said means operatively associated with the steering cylinders comprises a support bracket fixedly secured to the other of said frame members and located between the cylinder members of the steering cylinders, and a pair of axially aligned adjustment screws extending laterally in opposite directions from said support bracket and contacting the cylinder members.

3. The steering mechanism of claim 1 wherein said other of said frame member is the steering frame member which is formed with a pair of vertically spaced and horizontally orientated support plates, and said means operatively associated with the steering cylinders are a pair of support brackets that are adjustably secured to the support plates and carry guide rollers for maintaining the racks in engagement with the pinion.

4. A steering mechanism for an articulated vehicle having first and second frame sections adapted to be aligned along the longitudinal axis of the vehicle when the latter is moving in a straight-ahead direction, means pivotally interconnecting said frame sections about a vertical steering axis for relative steering articulation therebetween to either side of straight-ahead steering alignment of said frame sections, said steering mechanism comprising a pinion fixed to one of said frame sections with its rotational center located along said vertical steering axis, a pair of double-acting hydraulic steering cylinders mounted on the other of said frame sections and located on opposite sides of the vertical steering axis, each of said steering cylinders including a piston member and a cylinder member, cylinder support means pivotally connecting each cylinder member adjacent the forward end thereof to said other of said frame sections along an axis parallel to said vertical steering axis, said piston member having the rod portion thereof formed with a rack which meshes with said pinion, a guide roller for contacting the rack of each of the steering cylinders, a support bracket supporting each guide roller for rotation about an axis parallel to said vertical steering axis, and means connecting the support bracket to said other of said frame sections and permitting movement of said guide roller towards and away from said pinion with resultant adjustment of the associated steering cylinder about the cylinder support means and the rack relative to the pinion so as to provide proper meshing engagement between the rack and pinion.

* * * * *